United States Patent [19]
Ishizuka et al.

[11] Patent Number: 5,283,434
[45] Date of Patent: Feb. 1, 1994

[54] DISPLACEMENT DETECTING DEVICE WITH INTEGRAL OPTICS

[75] Inventors: Koh Ishizuka, Ohmiya; Tetsuharu Nishimura, Kawasaki; Yasushi Kaneda, Tokyo, all of Japan

[73] Assignee: Canon Kabushiki Kaisha, Tokyo, Japan

[21] Appl. No.: 992,418

[22] Filed: Dec. 17, 1992

[30] Foreign Application Priority Data

Dec. 20, 1991 [JP] Japan ................. 3-338596

[51] Int. Cl.⁵ ............................................. H01J 3/14
[52] U.S. Cl. ............................ 250/237 G; 250/231.16
[58] Field of Search ......... 250/237 G, 231.13, 231.14, 250/231.16; 356/375

[56] References Cited

U.S. PATENT DOCUMENTS

| | | | |
|---|---|---|---|
| 4,176,276 | 11/1979 | Kaul et al. | 250/237 |
| 4,766,310 | 8/1988 | Michel | 250/237 |
| 4,998,798 | 3/1991 | Ishizuka et al. | 250/237 G |

FOREIGN PATENT DOCUMENTS

| | | |
|---|---|---|
| 0163362 | 12/1985 | European Pat. Off. . |
| 0223009 | 5/1987 | European Pat. Off. . |
| 0463561 | 1/1992 | European Pat. Off. . |
| 2653545 | 5/1978 | Fed. Rep. of Germany . |
| 62-121314 | 6/1987 | Japan . |
| 1-180615 | 12/1989 | Japan . |
| 2-262064 | 10/1990 | Japan . |
| WO8603833 | 7/1986 | PCT Int'l Appl. . |
| WO8707944 | 12/1987 | PCT Int'l Appl. . |
| 2247313 | 2/1992 | United Kingdom . |

*Primary Examiner*—David C. Nelms
*Attorney, Agent, or Firm*—Fitzpatrick, Cella, Harper & Scinto

[57] ABSTRACT

Disclosed is a displacement detecting device for measuring displacement or velocity of an object. The device is provided with a casing having an optical window, a light-emitting element and a light-receiving element incorporated in the casing, a transparent plate member provided in the vicinity of the window, a first optical function element provided on the transparent plate member for splitting the light generated by the light-emitting element into plural light beams emitted therefrom, and a second optical function element provided on the transparent plate member for guiding the lights to the light-receiving element, the lights being modulated when the emitted light beams are irradiated onto a relatively displacing object.

14 Claims, 14 Drawing Sheets

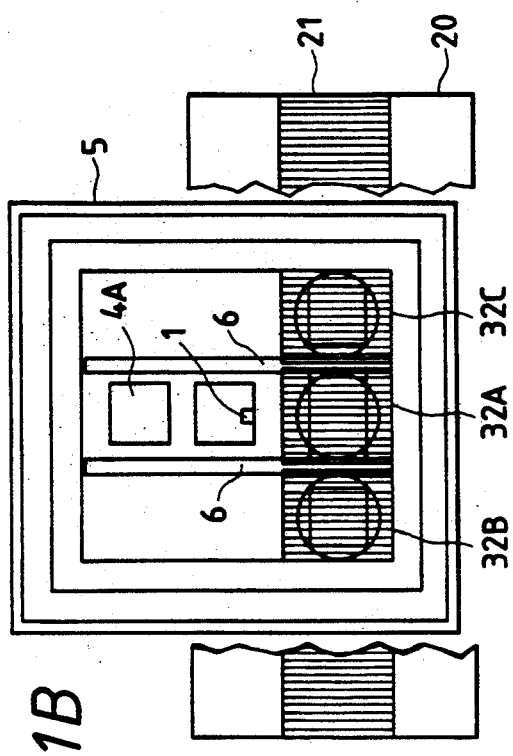
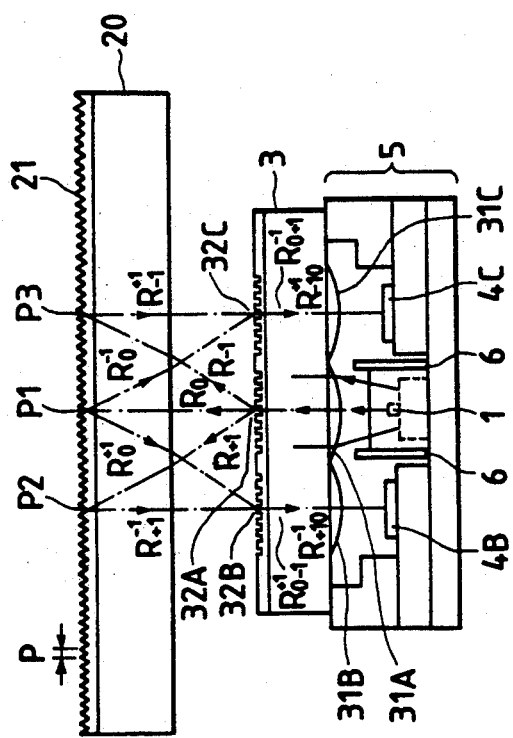
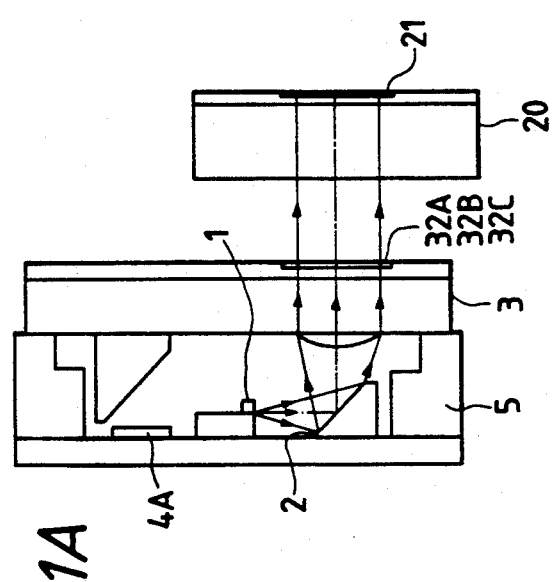
FIG. 1B
FIG. 1C
FIG. 1A

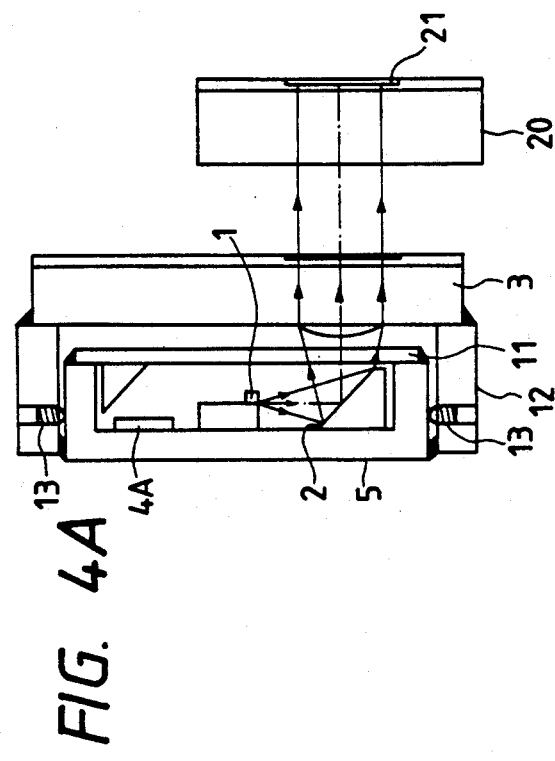
FIG. 4A
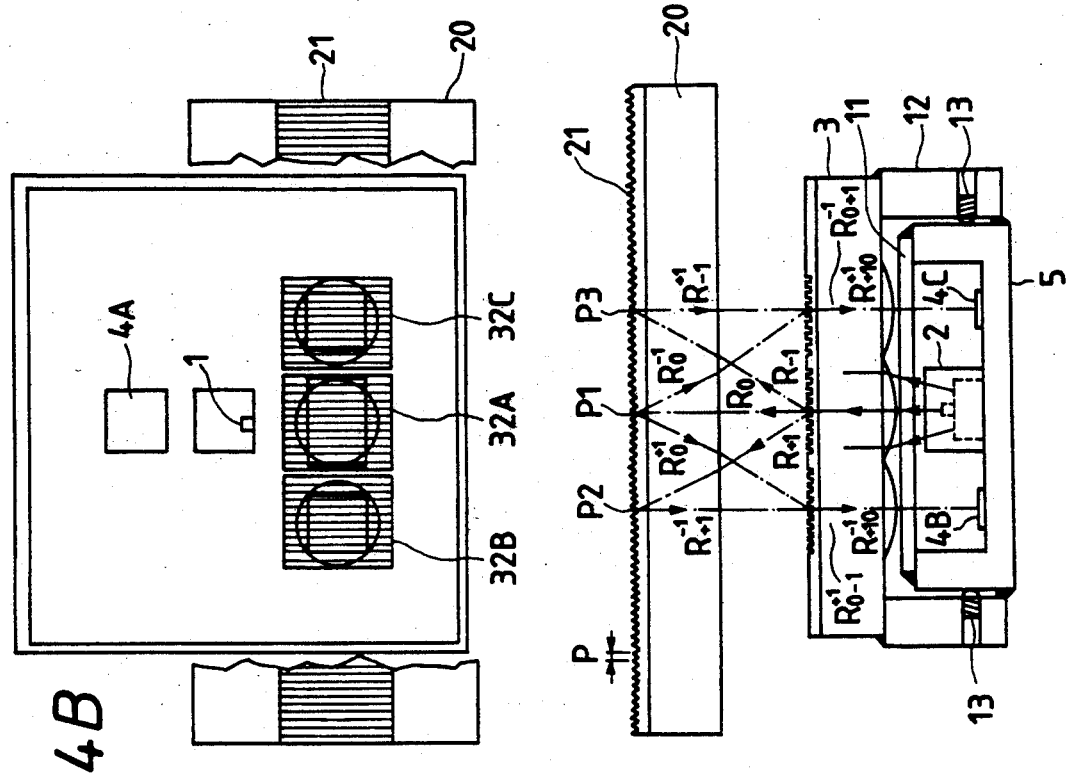
FIG. 4B
FIG. 4C

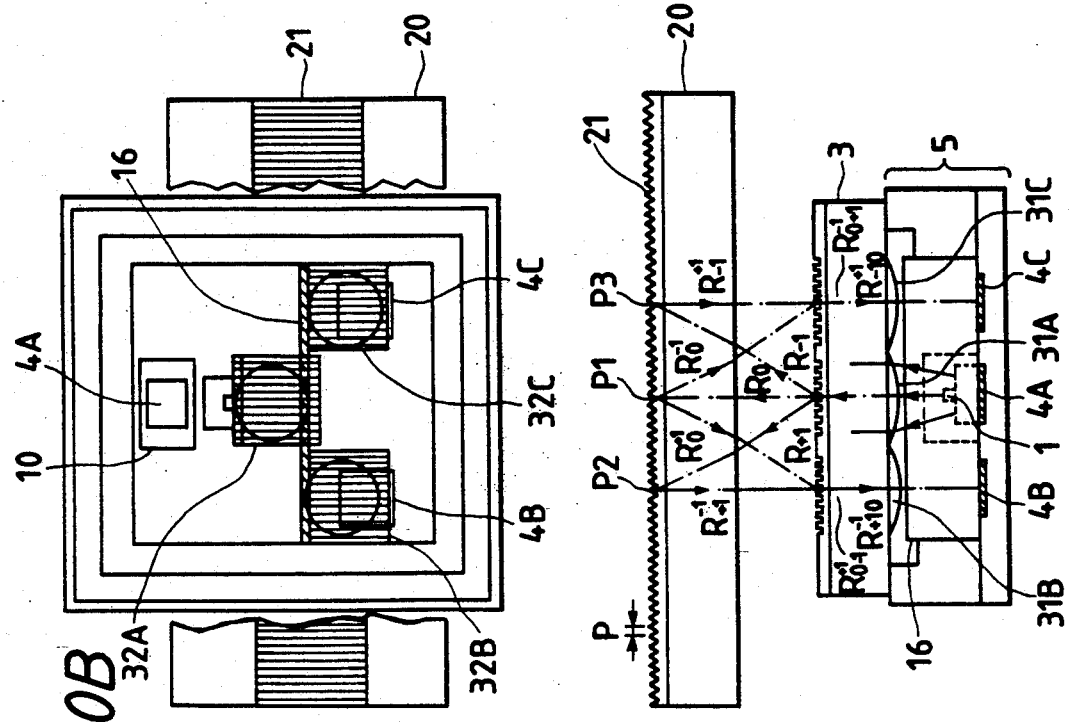
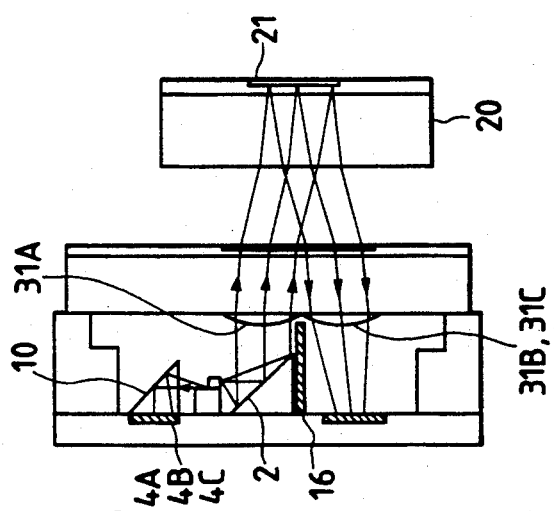
FIG. 10B
FIG. 10C
FIG. 10A

DISPLACEMENT DETECTING DEVICE WITH INTEGRAL OPTICS

BACKGROUND OF THE INVENTION

1. Field of the Invention

The present invention relates to an optical displacement detecting device, such as an encoder, a velocity sensor or an acceleration sensor for measuring displacement or velocity of an object, utilizing a fact that a light beam diffracted, or scattered by an object being displaced is subjected to phase modulation corresponding to the displacement or the velocity of the object.

2. Related Background Art

Conventionally, optical displacement sensors for precisely determining the physical amounts such as displacement of an object by irradiating the object with light, for example, an optical encoder, a laser Doppler velocimeter or a laser inteferometer, are widely utilized principally in the fields of NC working machines, OA equipment, robots or the like. As conventional examples of such displacement sensors, an optical encoder is disclosed for example in the Japanese Utility Model Laid-open Application No. 1-180615 and in the Japanese Patent Laid-open Application No. 62-121314. Also, a laser Doppler velocimeter is disclosed in the Japanese Patent Laid-open Application No. 2-262064.

For wider applications of such displacement sensors, there are desired further compactization (to the order of millimeters) and a higher precision and a higher resolution (in the order of 0.1 μm). A size in the order of millimeters will enable the field of application to be wide, since such a device can be used on smaller objects for example by direct adhesion thereon.

SUMMARY OF THE INVENTION

The object of the present invention is to provide an optical displacement detecting device, capable of being miniaturized and performing measurement with accuracy by fixing main parts of optical components to reduce error factors.

Other objects of the present invention, and the advantages thereof, will become fully apparent from the following description of the embodiments.

BRIEF DESCRIPTION OF THE DRAWINGS

FIGS. 1A to 1C are views showing the configuration of an encoder constituting a first embodiment of the present invention;

FIGS. 4A to 4C are views showing the configuration of a third embodiment;

FIGS. 10A to 10C are views showing the configuration of principal parts of a seventh embodiment;

DETAILED DESCRIPTION OF THE PREFERRED EMBODIMENTS

The optical displacement sensor in the following embodiments is provided with a casing having an optical window; a light-emitting element and a light-receiving element incorporated in the casing; a transparent plate member provided in the vicinity of the window; a first optical function element provided on the transparent plate member for splitting the light generated by the light-emitting element into plural light beams emitted therefrom; and a second optical function element provided on the transparent plate member for guiding the lights to the light-receiving element, the lights being modulated when the emitted light beams are irradiated onto a relatively displacing object.

First Embodiment

Figure 2:
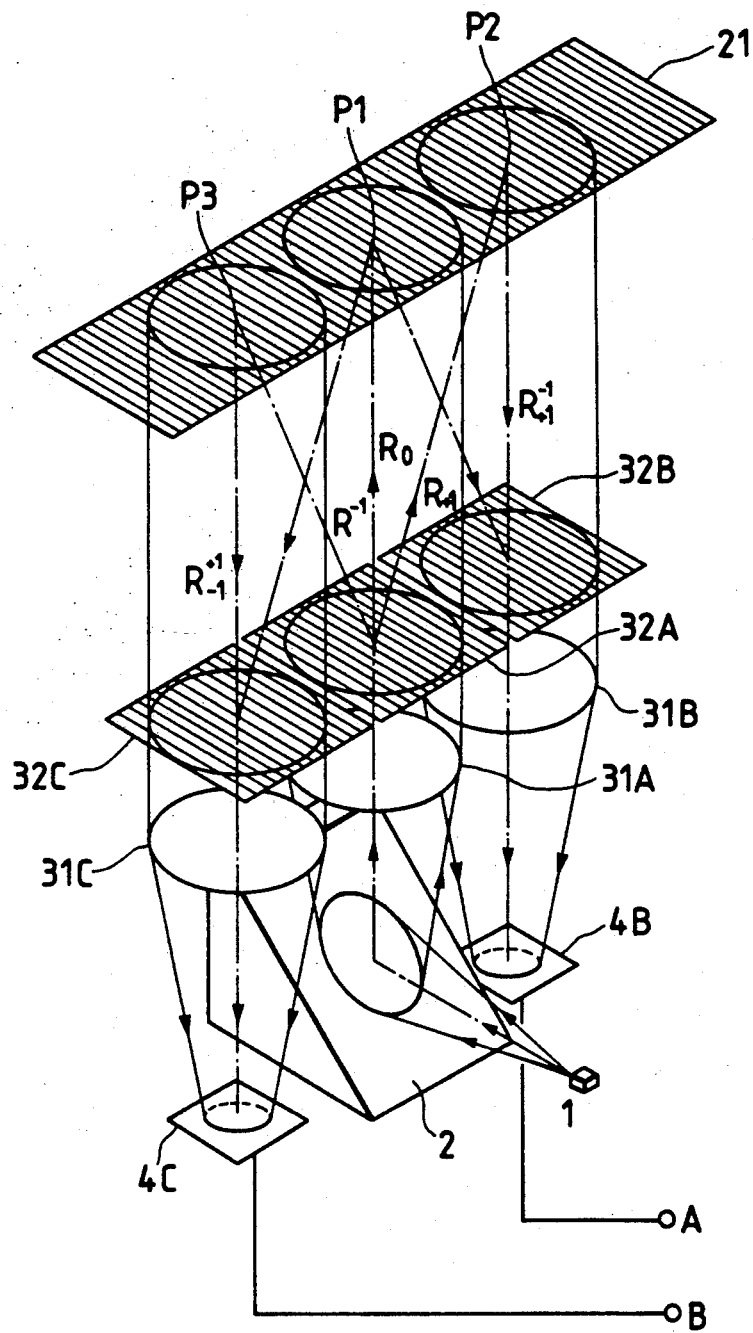
FIG. 2 is a perspective view showing the configuration of principal parts of the first embodiment.

FIGS. 1A to 1C are respectively a lateral view, a plan view and an elevation view of an optical encoder constituting a first embodiment of the present invention, and FIG. 2 is a perspective view of principal parts thereof.

A light-emitting element (semiconductor laser element) 1 for generating light has a size in the order of several hundred microns. The semiconductor laser may be replaced by a light-emitting diode. The light emitted from the light-emitting element 1 horizontally positioned is directed in a vertical direction by a mirror 2 having a 45° inclined mirror face. The mirror may also be replaced by a prism. In the directing direction of the light, there is provided a transparent glass plate 3. Three replica lenses 31A, 31B, 31C are provided on a face (inner face) of the glass plate 3, and three replica diffraction gratings 32A, 32B, 32C of the same pitch are provided on the other face (outer face), respectively, opposed to the three lenses 31A, 31B, 31C. The pitch P of the diffraction gratings is selected as 1.6 μm in the present embodiment. Also, for the purpose of photoelectric conversion of the received light, there are provided three light-receiving elements 4A, 4B, 4C each having a size in the order of several hundred micrometers. The light-receiving element is exemplified by a photodiode, an avalanche photodiode, a PIN photodiode, a CCD, and a photosensor IC having one of the above-mentioned light-receiving elements and a circuit for amplifying or processing the photocurrent obtained from such a photosensor element. The light emitted from the rear side of the semiconductor laser element 1 is guided to the light-receiving element 4A to monitor the light amount thereof, which is utilized for feedback control such as APC (auto power control). The light-receiving elements 4B, 4C detect signals each having phase difference, and the lenses 31B, 31C are provided to stably introduce the necessary light beams only into the small light-receiving elements 4B, 4C.

The light-emitting element 1 and the light-receiving elements 4A, 4B, 4C are enclosed in an opaque ceramic casing 5, and the glass plate 3 is mounted on the optical window in the upper portion of the casing 5 to hermetically seal the interior thereof. Between the light-emitting element and the light-receiving elements there are provided two shield plates 6 for avoiding direct mixing of the light from the light-emitting element to the light-receiving elements. The light-emitting element 1 and the light-receiving elements 4A, 4B, 4C are respectively connected to electrode patterns whose each end is exposed on the outside of the casing 5. In the case that a signal processing circuit is incorporated in the casing, the output signal of the circuit is output to the exposed electrode patterns. The casing 5 has a size in the order of several millimeters, thus constituting a very compact sensor unit.

In a position opposed to the sensor unit, a transparent scale 20 is mounted on an object which moves relative to the sensor unit, and on the scale 20 is formed a reflective diffraction grating 21 whose pitch P is 1.6 μm, same as in the diffraction gratings.

A diverging light beam emitted from the light-emitting element 1 horizontally positioned in the casing of the sensor unit is reflected by the mirror 2 in a vertical direction, and is converted into a substantially parallel light beam by the collimating lens 31A formed on the inner face of the glass plate 3 mounted on the window. The light beam is transmitted and diffracted by the diffraction grating 32A formed on the outer face of the glass plate 3, thus emerging therefrom as plural split light beams including a 0-th order diffracted light $R_0$, a +1st-order diffracted light $R_{+1}$ and a −1st-order diffracted light $R_{-1}$.

Among these light beams, the light beam $R_0$ passing through the diffraction grating 32A on the straight course is reflected and diffracted at a point P1 on the diffraction grating 21 formed on the scale 20, and is split into a +1st order diffracted light $R_0^{+1}$, and a −1st order diffracted light $R_0^{-1}$ to be phase modulated, respectively. Upon relative movement of the scale 20, the phase of the +1st-order diffracted light $R_0^{+1}$ is displaced by $+2\pi x/P$ while the phase of the −1st-order diffracted light $R_0^{-1}$ is displaced by $-2\pi x/P$, where x is the amount of displacement of the diffraction grating 21 while P is the pitch of the diffraction grating 21.

The +1st-order diffracted light $R_0^{+1}$ is transmitted and diffracted by the diffraction grating 32B formed on the surface of the glass plate 3, thereby being split into light beams including a 0th-order diffracted light $R_0^{+1}{}_0$, a −1st-order diffracted light $R_0^{+1}{}_{-1}$ and the other light beam. The −1st-order diffracted light $R_0^{+1}{}_{-1}$ emerges perpendicular to the surface of the diffraction grating and has a wave front phase of $+2\pi x/P$. Also, the −1st-order diffracted light $R_0^{-1}$ is transmitted and diffracted by the diffraction grating 32C formed on the surface of the glass plate 3, thus being split into light beams including a 0th-order diffracted light $R_0^{-1}{}_0$, a +1st-order diffracted light $R_0^{-1}{}_{+1}$ and the other light beam. The +1st-order diffracted light $R_0^{-1}{}_{+1}$ emerges perpendicular to the surface of the diffraction grating and has a wave front phase of $-2\pi x/P$.

If the diffraction grating 32B is displaced by P/4 in the grating phase arrangement with respect to the diffraction grating 32C, the wave front phase of the +1st-order diffracted light $R_0^{-1}{}_{+1}$ is displaced by $-2\pi(P/4)/P = -\pi/2$ to become $-2\pi x/P - \pi/2$.

On the other hand, the light beam $R_{+1}$ subjected to +1st-order diffraction by the diffraction grating 32A on the surface of the glass plate 3 is reflected and diffracted at a point P2 on the diffraction grating 21 of the scale 20, thus being split into light beams including a −1st-order diffracted light $R_{+1}^{-1}$, a 0th-order diffracted light $R_{+1}^{0}$ and the other light beam to be phase modulated, respectively. Among these light beams, the −1st-order diffracted light $R_{+1}^{-1}$ enters the diffraction grating 32B with a phase shift of $-2\pi x/P$, and a 0th-order diffracted light $R_{+1}^{-1}$ linearly transmitted by the grating has a wave front phase of $-2\pi x/P$.

Further, the light beam $R_{-1}$ subjected to −1st-order diffraction by the diffraction grating 32A formed on the surface of the glass plate 3 is reflected and diffracted at a point P3 on the diffraction grating 21 of the scale 20, thus being split into plural light beams including a +1st-order diffracted light $R_{-1}^{+1}$, a 0th-order diffracted light $R_{-1}^{0}$, and the other light beam to be phase modulated, respectively. Among these, the +1st-order diffracted light $R_{-1}^{+1}$ enters the diffraction grating 32C with a phase shift of $+2\pi x/P$, and a 0th-order diffracted light $R_{-1}^{+1}$ linearly transmitted by the grating has a wave front phase of $+2\pi x/P$.

The light beams $R_{+1}^{-1}{}_0$ and $R_0^{+1}{}_{-1}$ superimposed at the diffraction grating 32B become an interference light, which enters the light-receiving element 4B after condensing by a lens 2B. The interference phase can be represented by:

$$[+2\pi x/P] - [-2\pi x/P] = 4\pi x/P$$

so that a brightness-darkness signal of one cycle is generated every time the diffraction grating 21 on the scale 20 is displaced by ½ of the pitch.

Also, the light beams $R_{-1}^{+1}{}_0$ and $R_0^{-1}{}_{+1}$ superimposed at the diffraction grating 32C become an interference light, which enters the light-receiving element 4C after condensing by a lens 2C. The interference phase in this state can be represented by: $[-2\pi x/P - \pi/2] - [+2\pi x/P] = -4\pi x/P - \pi/2$ so that a brightness-darkness signal of one cycle is generated every time the diffraction grating 21 of the scale 20 is displaced by ½ of the pitch. The brightness-darkness timing is deviated by ¼ of a cycle from that of the light-receiving element 4B.

Thus in response to the displacement of the scale, from the light-receiving elements 4B, 4C there can be obtained cyclic signals A, B whose phases are displaced by ¼ of the cyclic period (90°) from each other. The relative displacement between the sensor unit and the scale can be detected, based on the signals and utilizing known signal processing circuits such as an amplifier, an interpolation circuit, a binarizing circuit, and a direction judgment circuit These circuits, or a part thereof, are preferably incorporated in the sensor unit in order to attain a higher level of integration.

The present embodiment can provide a very simple, compact and inexpensive encoder capable of highly precise and stable detection of the displacement, because the interference optical system is composed of lenses and diffraction gratings formed by replica preparation on both faces of a glass plate, and a diffraction grating formed on a scale. In addition, there are provided the following features:

(1) The interference optical system is so constructed as to effect each of the +1st-order diffraction, −1st-order diffraction and 0th-order diffraction by means of three diffraction gratings (32A, 21 and 32B or 32C).

Accordingly, a variation in the diffraction angle resulting from a variation in the wavelength of the light source can be compensated for by the repeated diffraction, so that the emerging angle (0°) from the diffraction grating 32B or 32C is maintained constant. Thus, the superimposing condition and the difference of the proceeding directions in the two light beams are maintained constant. Therefore, the semiconductor laser in which the variation in wavelength is unavoidable, can be employed without, the temperature compensating function. Such a temperature compensating function may be added if a higher stability is required in the sensor.

(2) Even if the scale 20 and the glass plate 3 are not completely parallel, the optical paths of the respective interference two lights are deviated in the same direction. Thus, it is easy to maintain the superimposing condition or the difference of the proceeding directions. Consequently, there can be obtained a high precise encoder whose signal output is not affected by the precision of mounting of the scale. In other words, a relatively rough accuracy is tolerated in the mounting of the scale 20, or the sensor may be used in a severe condition that will deteriorate the accuracy of the mounting. In combination with the fact that the sensor unit is formed in a one-chip structure, the resistance to severe conditions such as temperature variation or mechanical vibration is significantly improved.

(3) The mixing of light beams on the diffraction grating is conducted in two mutually separate points (32B, 32C). Thus, the signals of desired phase difference can be obtained by a phase difference formed in the diffraction gratings 32B, 32C in advance without especially employing splitting optical systems, therefore, the designing of the optical system can be facilitated. Also, the phase difference does not depend on a minor difference in the cross-sectional shape of the diffraction gratings, and amplitude grating may be employed for this purpose.

(4) The splitting and mixing of the light beams are conducted in different places of the diffraction grating to separate light paths. Therefore, if the light reflected on each face is returned, it never enters the light-receiving element. Also, the presence of the shield plates 6 completely separates the outgoing light paths from the returning light paths in the casing, thereby eliminating the influence of unnecessary light.

(5) Since the outgoing and returning light paths are separated, the distance between the light-emitting element and the lens can be reduced, by the use of small microlenses of a short focal length, whereby a smaller and thinner structure can be easily attained.

(6) Since the optical path of the light beam from the light-emitting element is bent by a reflecting element, the distance between the lens and the light-emitting element can be separated by a desired focal length even if the glass plate and the light-emitting element are actually positioned close, so that a thinner structure can be easily attained.

(7) A finer pitch in the diffraction grating on the scale increases the diffraction angle, thus the diffracted light beams can be spatially separated sufficiently even when the distance to the scale is small, thereby realizing the miniaturization. Namely, there can be simultaneously attained the miniaturization and the higher precision and resolution, which are contrary to each other in general.

(8) Since the device is formed by sealing the window of the casing with the plate-shaped optical component, the bonding operations for the light-emitting element, light-receiving elements, one-chip electronic circuit and electrodes, the preparing operations for the plate-shaped optical function component, and the coupling operation of both the optical element and the other elements are independent. Consequently, the efficiency of assembly can be satisfactorily high.

Second Embodiment

Figure 3:
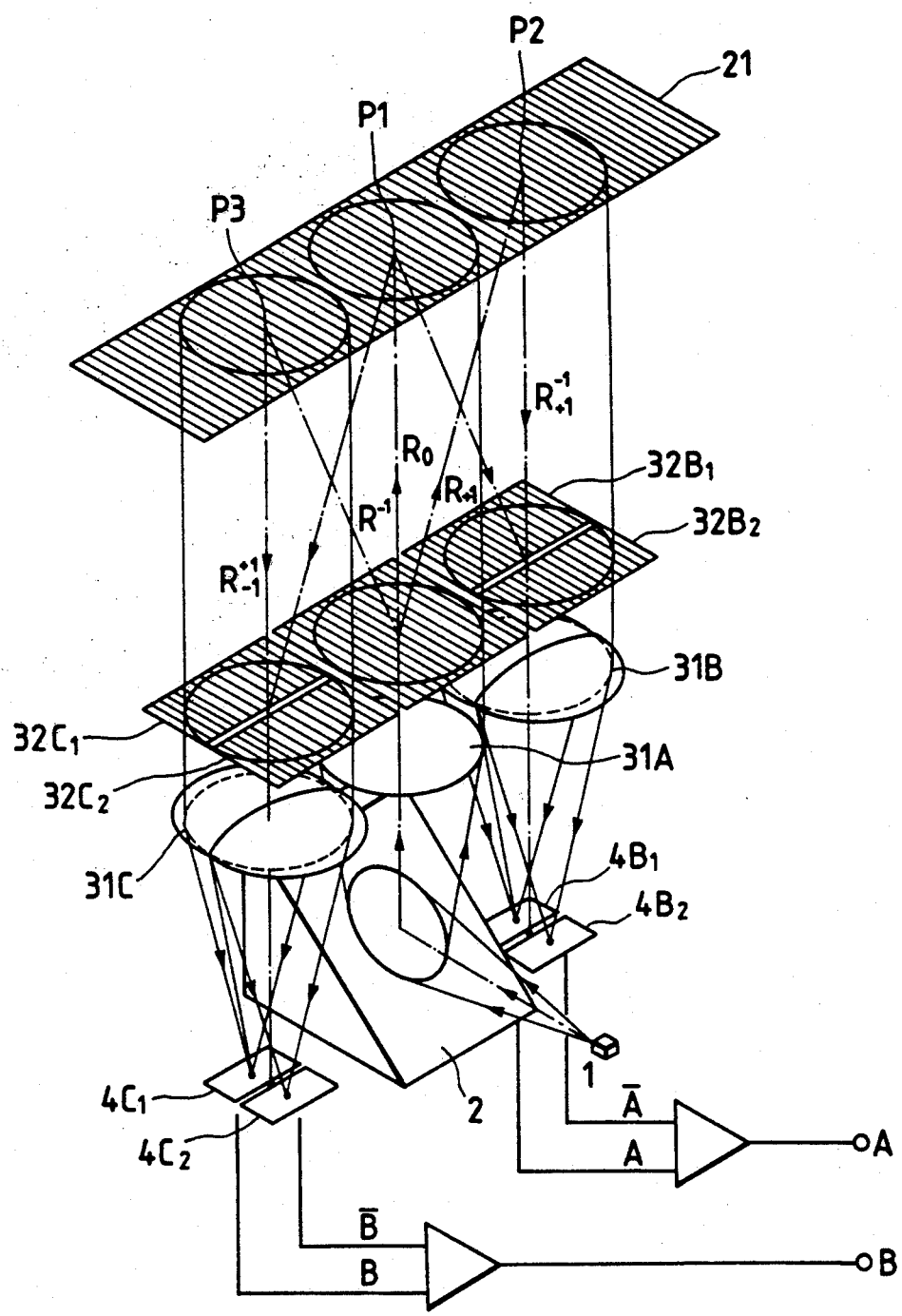
FIG. 3 is a similar view showing the configuration of a second embodiment.

An encoder, constituting a second embodiment of the present invention and attaining a further improved stability by the modification of the foregoing first embodiment, is shown in FIG. 3, in which the components the same as or equivalent to those in said first embodiment are represented by the same symbols. Since the present embodiment is substantially similar to the first embodiment, it is only shown in a perspective view, and is explained by the difference from the first embodiment. The present embodiment is featured in that 4-phase signals each deviated by $\frac{1}{4}$ of a cycle (90°) are generated, and two-phase signals are formed therefrom.

In the present embodiment, composite lenses 31B, 31C are formed on the glass plate. Four diffraction gratings $32B_1$, $32B_2$, $32C_1$, $32C_2$ are arranged so as to deviate in the phases as shown in FIG. 3. Thus, diffracted lights of different phases are emitted from each of diffraction gratings ($32B_1$ and $32B_2$, $32C_1$ and $32C_2$), and are condensed by the lens elements of the composite lenses, respectively. When the diffraction grating $32B_1$ is taken as a reference and the phase thereof is 0°, the phases of the diffraction gratings $32C_1$, $32B_2$ and $32C_2$ are arranged at 90°, 180° and 270°, respectively, with each phase difference of being $\frac{1}{4}$ of a cycle. Also, four light-receiving elements $4B_1$, $4B_2$, $4C_1$, $4C_2$ are arranged as shown in FIG. 3, in order to detect the respective amounts of the light beams transmitted by the diffraction gratings and condensed by the lens elements, respectively. The light-receiving elements provide 4-phase signals with each phase difference of $\frac{1}{4}$ of a cycle. The 4-phase signals are connected in push-pull manner as shown in the drawing to differentially amplify the signals of phase difference of 180°, thereby producing two-phase signals A, B.

With such a configuration, the variation in a DC component of the periodic signal resulting from the phase of the scale is eliminated. Thus, the influence of defects in the scale (such as inclination in the mounting of the scale, dust on the scale, or uneven reflectance of the scale because of failure in the manufacture) or in the light source (such as fluctuation in the light amount, variation in the wavelength, or mixing of unnecessary light) can be cancelled, and there is obtained an encoder capable of providing stable signals even under undesirable conditions.

Also, since the interference signals of each different phase are spatially separated and supplied to different light-receiving elements by means of the composite lenses, there can be reduced the deviation in phase and the loss in S/N ratio. The composite lenses can be easily obtained by the replica method.

Third Embodiment

FIGS. 4A to 4C illustrate an encoder, constituting a third embodiment of the present invention. The fine components on the order of millimeters, employed in the present embodiment, require an extremely high accuracy of assembling, since a positional deviation in the order of several tens of microns results in a significant deviation of the optical path to deteriorate the precision of detection. Thus, the present embodiment is provided with an adjusting mechanism for facilitating the adjustment of the optical system. The detecting principle of the encoder is the same as that of the first embodiment, or may be made the same as that of the second embodiment.

Referring to FIGS. 4A to 4C, optical members such as a light-emitting element 1, a mirror 2, and photosensor elements 4A, 4B, 4C are fixed in a casing 5, and a transparent glass plate 11 for hermetic seal is adhered to an opening in the upper face of the casing. Around the casing 5, there is positioned a fixing frame 12. On the upper face of the frame 12 is mounted a glass plate 3 in which optical function elements are formed. The optical members fixed in the casing 5 can be aligned with the optical function elements such as lenses and diffraction gratings formed on the glass plate 3, by adjustment of the relative positional relationship between the fixing frame 12 and the casing 5. After the adjustment, the casing is fixed by screws 13 provided in four sides of the fixing frame 12, and the stability is increased by filling the gap therebetween with an adhesive material. Thus, the present embodiment can provide an encoder of a high precision, enabling easy adjustment in the assembly, since the components of the encoder are formed into two units which are mutually adjustable.

The casing incorporating the light-emitting element generates considerable heat. High temperature is not desirable for the optical function elements such as replica lenses and diffraction gratings on the glass plate, and may directly affect the detecting accuracy of the encoder, since particularly the diffraction gratings show a variation in the pitch by thermal expansion. In this regard, the casing 5 and the glass plate 3 are separated as an independent unit, whereby the present embodiment can considerably suppress the thermal conduction from the casing 5 to the glass plate 3. Also, the transparent glass plate 11 has the thermally insulating effect.

Also, the loss in reliability resulting from the exposure of the semiconductor laser element to the air in the course of assembly can be minimized by adhering the transparent glass plate 1 for hermetic seal to the window of the casing 5, immediately after the mounting of electronic components such as the light-emitting element and the photosensor elements. Furthermore, there is provided an advantage that the designing in consideration of the hermeticity of the package and the gas generation is facilitated.

Fourth Embodiment

Figure 5A:
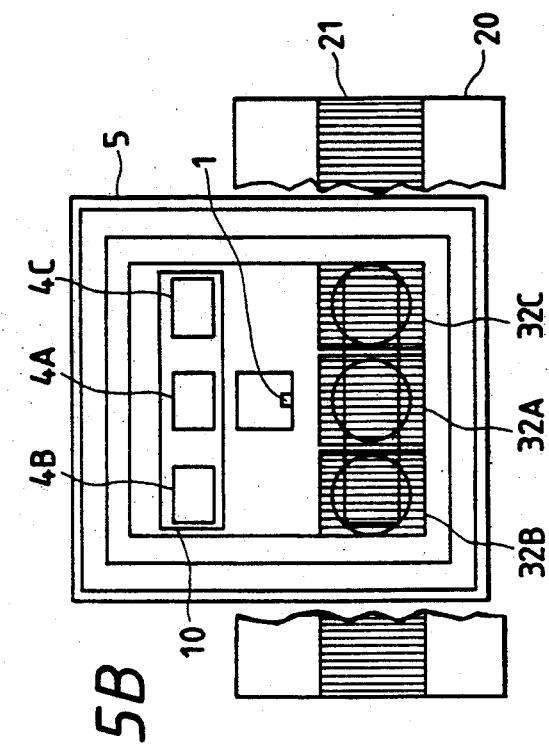
FIGS. 5A to 5C are views showing the configuration of a fourth embodiment.
Figure 5B:
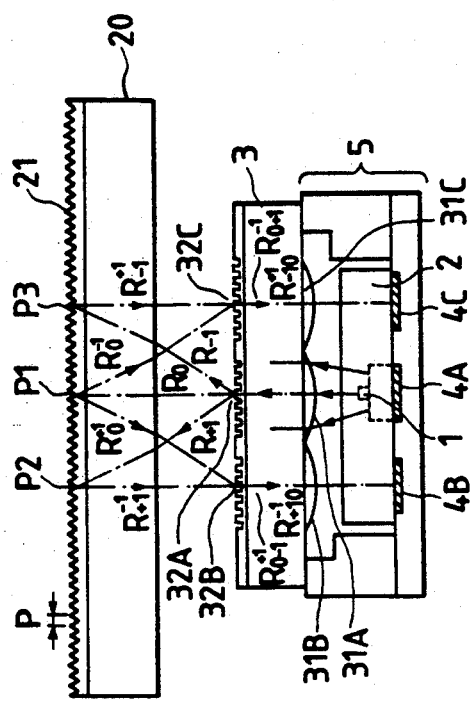
Figure 5C:
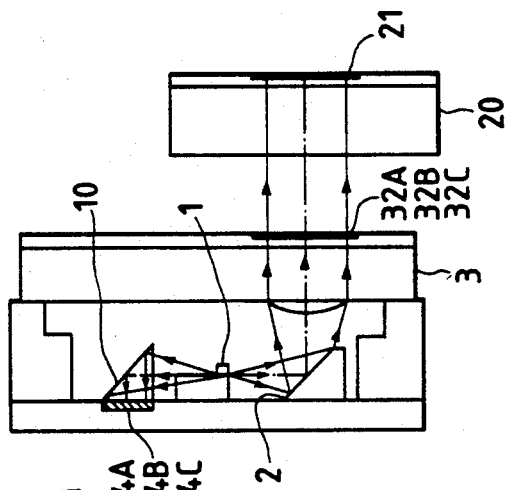
Figure 6:
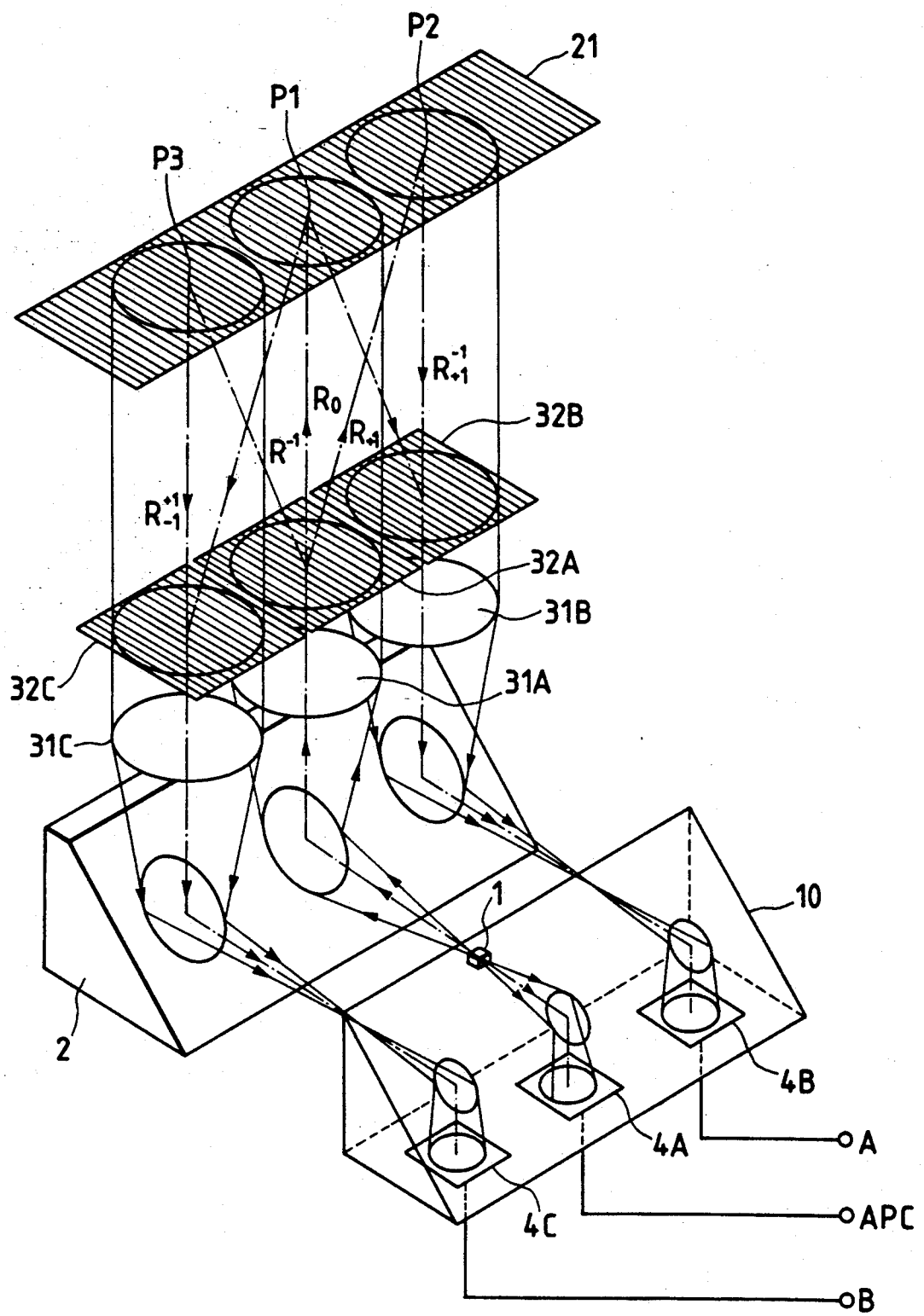
FIG. 6 is a perspective view showing the configuration of principal parts of the fourth embodiment.

In the following there will be explained a fourth embodiment in which the arrangement of components of the above-mentioned encoder is modified. FIGS. 5A to 5C are views of the present embodiment seen from three directions, and FIG. 6 is a perspective view of the principal part. In these drawings, the components the same as or equivalent to those in the foregoing embodiments are represented by the same symbols.

Light-receiving elements 4A, 4B, 4C are arranged in parallel on the same substrate. The mirror 2 is larger than in the foregoing embodiments, and serves to reflect the light from the light-emitting element 1 for emission to the outside and to reflect the incoming light reflected by the scale 20 to be guided to the light-receiving elements 4B, 4C. A prism mirror 10 reflects the monitoring light emitted from the rear side of the light-emitting element 1 toward the light-receiving element 4A, and also reflects the light incoming from the scale 20 and reflected by the mirror 2, toward the light-receiving elements 4B, 4C.

In comparison with the foregoing embodiments, the present embodiment has the advantage of improved assembling efficiency, since the light-receiving elements are arranged in parallel on a substrate and the mirrors 2, 10 are relatively large in comparison with the casing.

Figure 7:
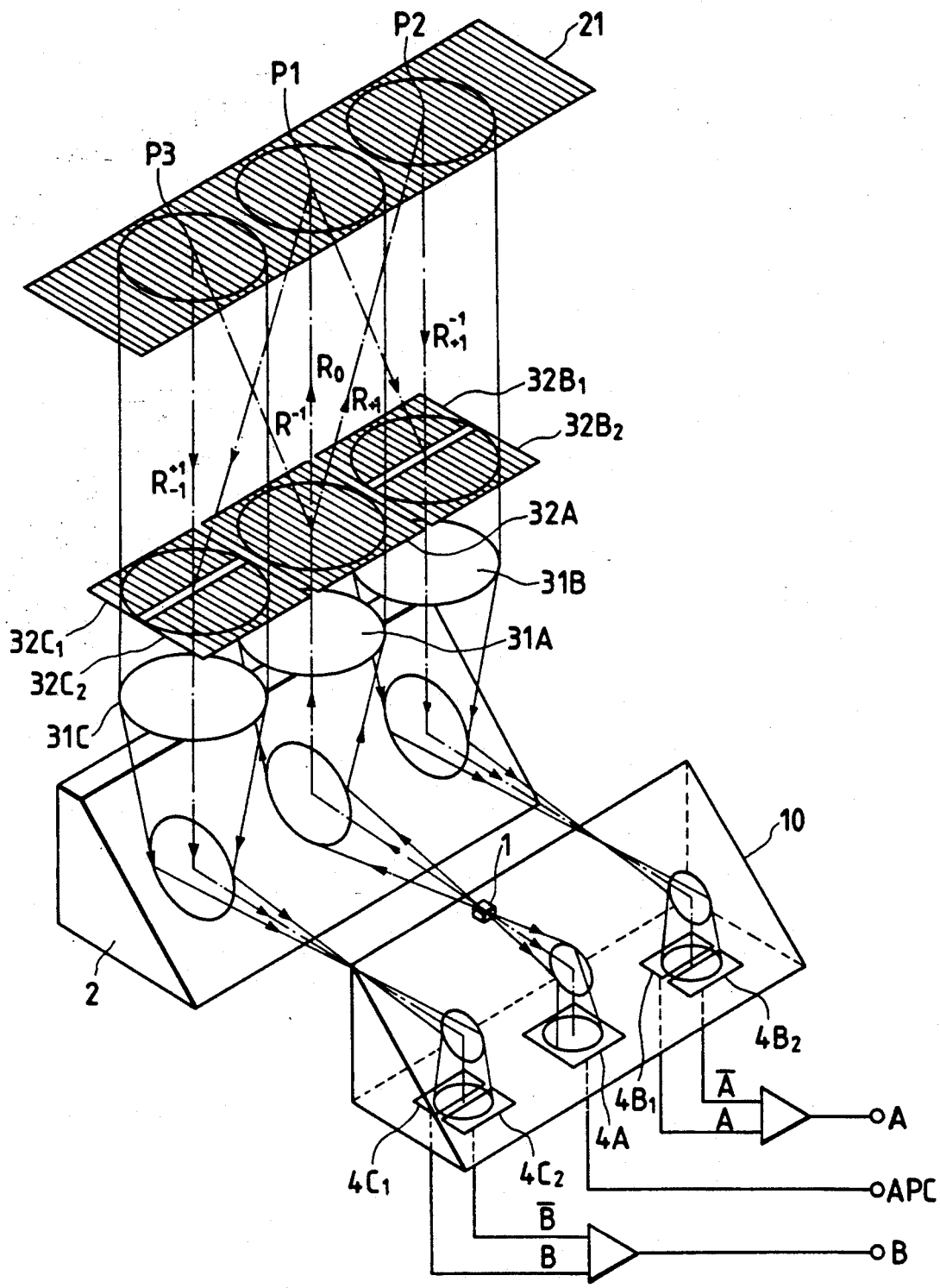
FIG. 7 is a similar view showing the configuration of a fifth embodiment.

Also, since the light-receiving elements are arranged linearly, the signal light beams are condensed between the mirrors 2 and 10, and signal lights of satisfactory S/N ratio can be introduced into the light-receiving elements, for example, by inserting a holed shield plate in the condensing position. Furthermore, since the prism mirror 10 is mounted on the linearly arranged light-receiving elements, it is possible to intercept the ghost light in directions other than the incident direction of the signal light by masking the faces of the prism mirror, other than the entrance face for the signal light, for example, with opaque paint. It is also possible to intercept the ghost light entering with an incident angle larger than that of the signal light, by coating the entrance face for the signal light, with a thin film reflecting the light entering with an incident angle larger than that of the signal light. Through these means there can be obtained signals of a satisfactorily high S/N Fifth Embodiment A fifth embodiment, in which the technical concept of the foregoing fourth embodiment is applied to the configuration shown in FIG. 3, is shown in FIG. 7, in which components the same as or equivalent to those in the foregoing embodiments are represented by the same symbols. Also, the present embodiment can provide an encoder with a very high resistance to ambient conditions, the same as in the embodiment shown in FIG. 3. More preferably, the lenses 31B, 31C are constructed as composite lenses as in the case of FIG. 3.

Sixth Embodiment

Figures 8A, 8B, 8C:
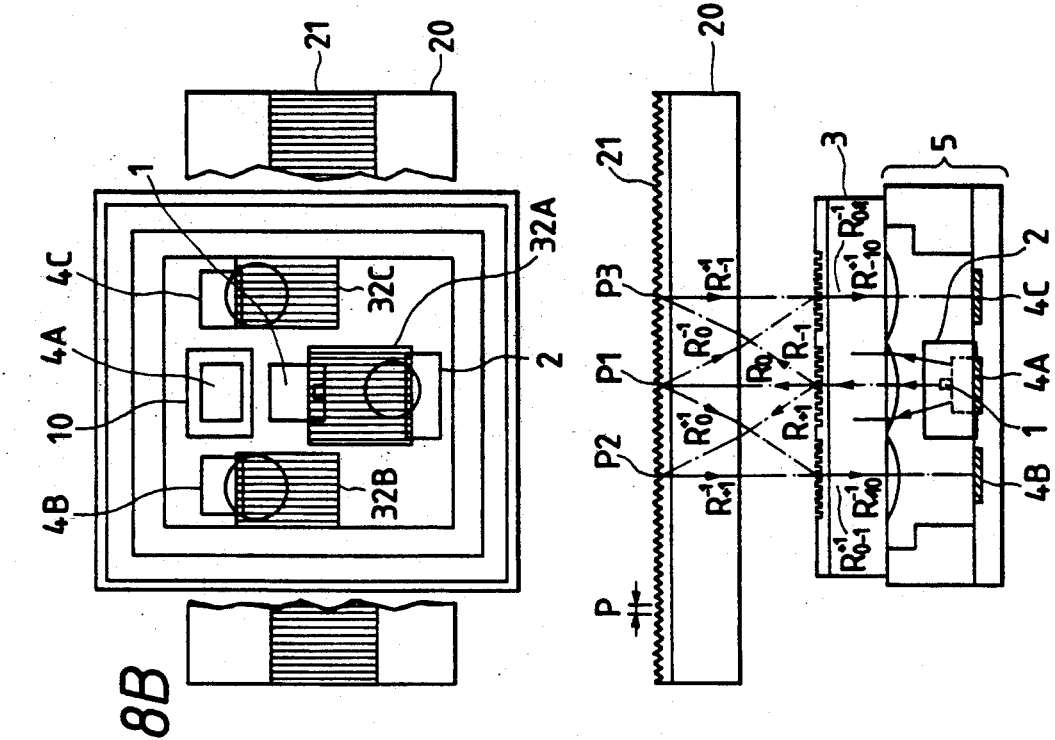
FIGS. 8A to 8C are views showing the configuration of a sixth embodiment.
Figure 9:
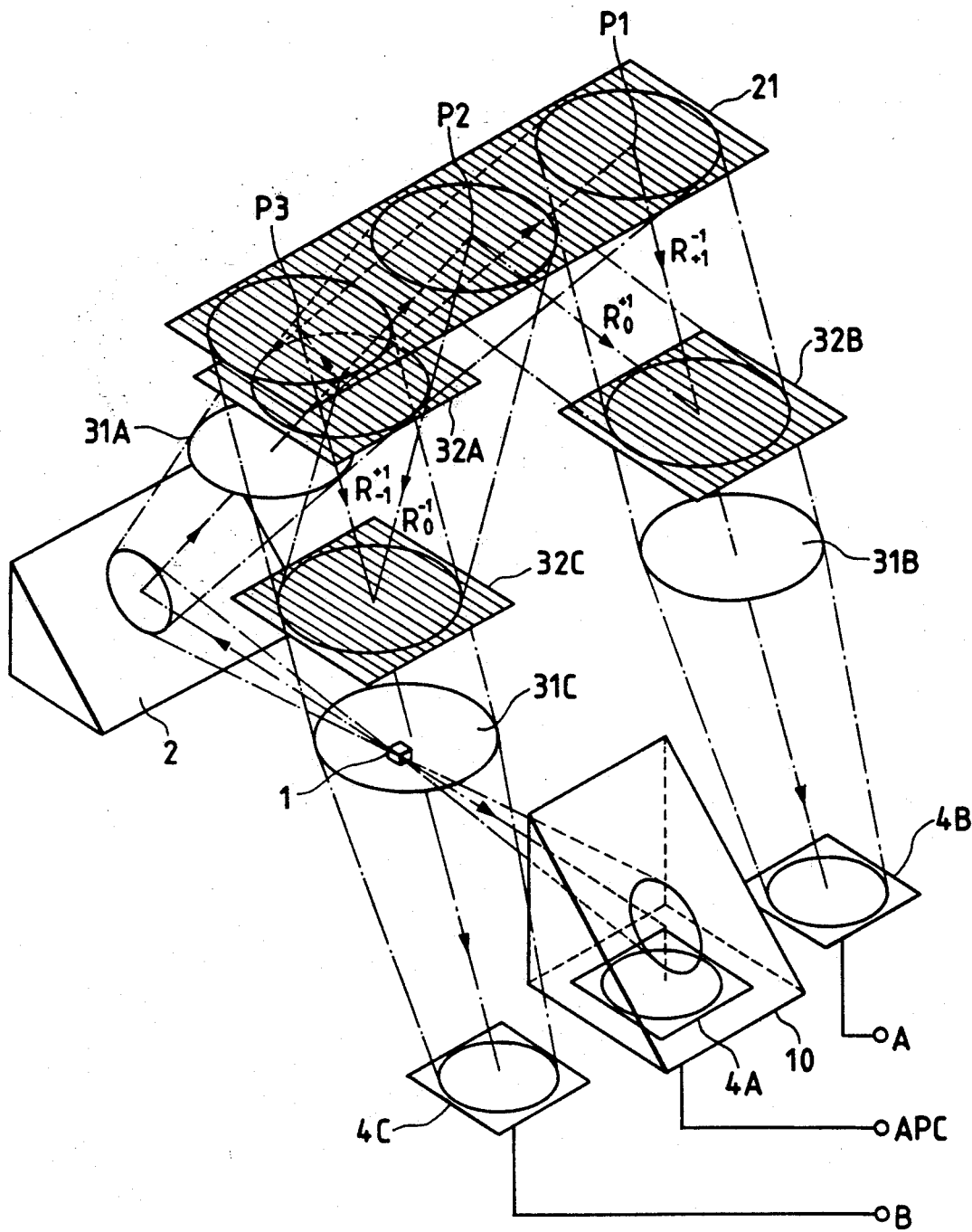
FIG. 9 is a perspective view showing the configuration of principal parts of the sixth embodiment.

FIGS. 8A to 8C are views, seen from three directions, of an optical encoder constituting a sixth embodiment of the present invention, and FIG. 9 is a perspective view of the principal part thereof.

In the above-mentioned embodiments, the light beams entering the diffraction grating 21 of the scale 20 and the light beams reflectively diffracted by the diffraction grating are contained in the same plane. In the present embodiment, the light beam is introduced to the diffraction grating 21 at an angle deviated from the vertical direction, whereby the plane of the incident light beams to the diffraction grating 21 is different from the plane of the reflected light beams. For this purpose, the angle of the mirror 2 is selected larger than 45° (for example at 55°) with respect to the direction of the light beam emitted from the light-emitting element 1, whereby the light beam reflected by the mirror 2 is inclined (70°) from the vertical direction. The light beams subjected to reflective diffraction by the diffraction grating 21 are guided through the optical function elements of the glass plate 3, to the light-receiving elements 4B, 4C. Also, the monitoring light emitted from the rear side of the light-emitting element 1 is reflected by the prism 10 and guided to the light-receiving element 4A. These light-receiving elements 4A, 4B, 4C are arranged linearly on a substrate.

As described above, in the present embodiment, since the light beams are separated before and after the diffraction grating 21, the unnecessary light hardly enters the light-receiving elements, therefore signal light of high S/N ratio can be obtained. Also, since the light beam diameter can be made larger, there can be reduced the influence of dust or the like present on the scale. Furthermore, the optical components such as lenses can be made larger in size, whereby the working and assembling of the components are made easier. It is furthermore possible to reduce the number of the component parts.

Seventh Embodiment

FIGS. 10A to 10C illustrate a seventh embodiment, based on the same technical concept as that of the above-explained sixth embodiment. In the present embodiment, in order to introduce the light beam to the diffraction grating 21 at an angle deviated from the vertical direction the optical axis of the lens 31A is shifted from the axis of the light beam emitted from the light-emitting element 1 and reflected by the mirror 2 in the vertical direction, thereby refracting the light beam passing through the lens 31A. In this manner, as in the sixth embodiment, the incident light beams to the grating 21 and the reflected light beams therefrom are contained in different planes and can be separated from each other. A light shield plate 16 is inserted as illustrated in order to prevent entry of unnecessary light into the light-receiving elements 4B, 4C. The shield plate 16 may be omitted by forming the mirror 2 in the same size as the shield plate 16 and applying a light shielding treatment such as coating with opaque paint on a face of the mirror 2 at the side of the light-receiving elements 4B, 4C to obtain the same function as the shield plate 16.

Eighth Embodiment

Figure 11:
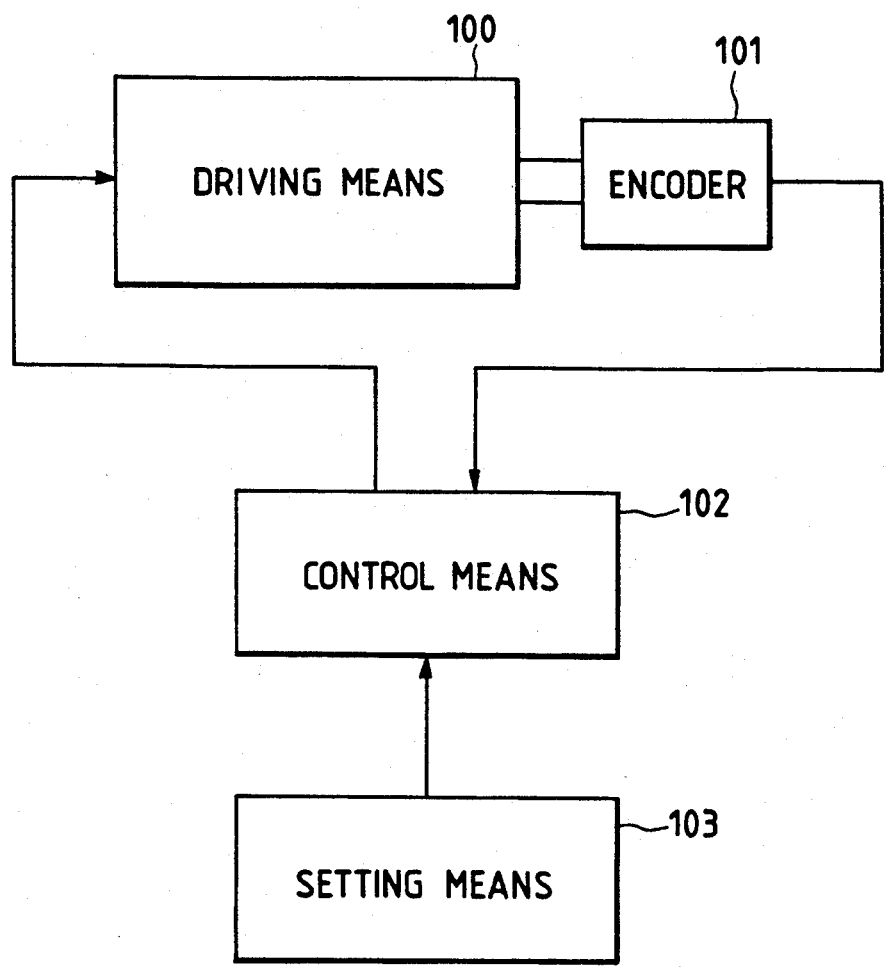
FIG. 11 is a block diagram of a driving system with an encoder, constituting an eighth embodiment.

FIG. 11 is a block diagram of a driving system employing the above-mentioned encoder, as an embodiment showing an application thereof. An encoder 101, according to any of the foregoing first to sixth embodiments, is mounted on an output part of driving means 100 having a driving source such as a motor, an actuator or an engine, or on a moving part of a driven object, to detect displacement conditions such as amount or velocity of the displacement. The detection output of the encoder 101 is fed back to control means 102, which sends a drive signal to the driving means 100 so as to attain a condition set by setting means 103. A driving condition set by the setting means 103 can be attained by such a feedback system. Such a driving system can be applied to office equipment such as a typewriter, printer, copying machine or facsimile, imaging equipment such as a camera or video equipment, information record/reproducing equipment, robots, working apparatus, manufacturing apparatus, transportation equipment or any other apparatus provided with driving means.

Ninth Embodiment

Figure 12B:
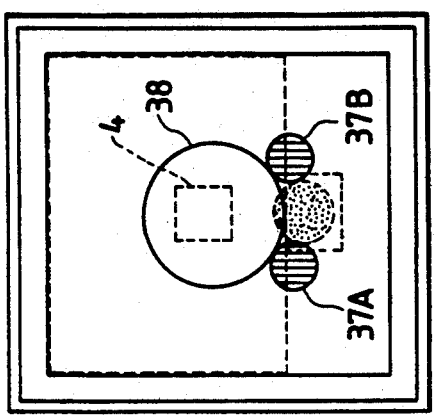
FIGS. 12A to 12C are views showing the configuration of a laser Doppler displacement sensor constituting a ninth embodiment.
Figure 12C:
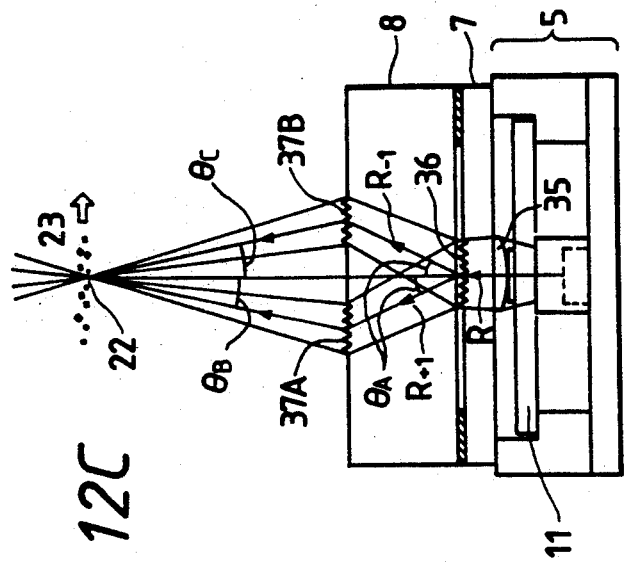
Figure 12A:
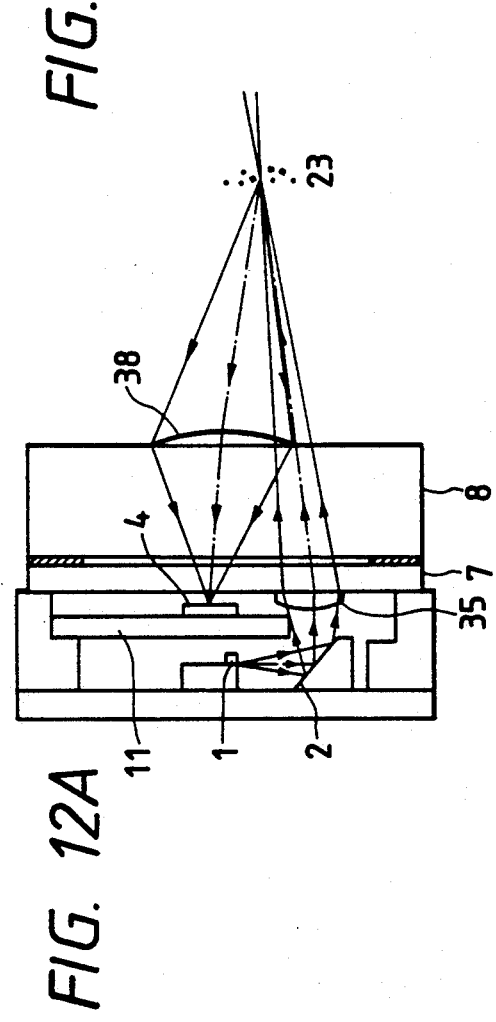

Though the foregoing embodiments have been limited to encoders, the optical displacement sensor of the present invention is also applicable to a Doppler displacement sensor as will be explained in the following. FIGS. 12A to 12C are respectively a lateral view, a plan view and an elevation view of a Doppler displacement sensor.

A light-emitting element (semiconductor laser element) 1 has a size in the order of several hundred microns. The light emitted from the light-emitting element 1 horizontally positioned is reflected by the mirror 2 having a mirror face with an angle larger than 45° (for example 55°) to be directed in a direction deviated from the vertical direction. The mirror may be replaced by a prism. In the proceeding direction of the light, there are provided two transparent glass plates 7, 8 with a spacer therebetween. A replica lens 35 is formed on the inner face of the glass plate 7, and a diffraction grating 36 is formed on the outer face. On the outer face of the glass plate 8, two replica diffraction gratings 37A, 37B and a replica lens 38 are formed. With such structure, the emerging two light beams cross at a condensing point. Also, a light-receiving element 4 of a size in the order of several hundred microns is provided to receive the light beams and effect photoelectric conversion. The light-receiving element is exemplified by a photodiode, an avalanche photodiode, a PIN photodiode, a CCD, and a photosensor IC having such a photosensor element and a circuit for amplifying or processing the photocurrent therefrom.

The light-emitting element 1 and the photosensor element 4 are enclosed in an opaque ceramic casing 5, and the glass plate 7 is mounted on a window in the upper portion of the casing 5, thereby hermetically sealing the interior thereof. The light-emitting element 1 and the photosensor element 4 are connected to electrode patterns whose each end is exposed to the outside of the casing 5. In the case that a signal processing circuit is incorporated in the casing, the output signal of the circuit is output to the exposed electrode patterns. The casing, being in the order of several millimeters in size, constitutes a very compact sensor unit.

The sensor unit emits two laser beams, and a relatively moving object of scattering-reflecting character (for example small particles or a scattering reflective surface) is positioned at the crossing point 22 of the laser beams.

A diverging light beam emitted from the light-emitting element 1 is reflected by the mirror 2, then converted into a converging light beam R by the lens 35 formed on the inner face of the glass plate 7, and transmitted and diffracted by the diffraction grating 36 formed on the inner face of the glass plate 8, thus being split into +1st-order and −1st-order diffracted lights bent by an angle $\theta_A$ by the diffraction, and a linearly proceeding 0th-order light of a small amount. As the 0th-order diffracted light linearly passing through the grating 36 does not contribute to the detection signal, the cross-sectional shape of the diffraction grating 32A is preferably so designed that the required ±1st-order diffracted lights become strong and the 0th-order diffracted light becomes weak.

The light beams $R_{-1}$, $R_{+1}$ subjected to ±1st-order diffractions on the diffraction grating 36 are diffracted by the diffraction gratings 37A, 37B and converge at a target point 22 in the vicinity of the object 23, with incident angles $\theta_B$, $\theta_C$. These relations are represented by the following equations:

$$\left.\begin{array}{l}\sin\theta_A = \lambda/P_A \\ \sin\theta_B = -\lambda/P_B - \sin\theta_A \\ P_B = P_C\end{array}\right\}\begin{array}{l}\sin\theta_B = \lambda/(P_A - P_B) \\ \sin\theta_B = \sin\theta_C\end{array}$$

wherein $P_A$ is the pitch of the diffraction grating 36, $P_B$ is the pitch of the diffraction grating 37A, $P_C$ is the pitch of the diffraction grating 37C, and $\lambda$ is the wavelength of the light beam ($P_A > P_B$).

Because of the crossing of the two light beams in the vicinity of the target point 22, there are formed interference fringes in the space, and the pitch $P_0$ of the fringes is represented by:

$$\begin{aligned} P_0 &= \lambda/(\sin\theta_B + \sin\theta_C) \\ &= \lambda/\{\lambda/(P_A - P_B) + \lambda/(P_A - P_C)\} \\ &= (P_A - P_B) + (P_A - P_C) \\ &= (P_A - P_B)/2 \end{aligned}$$

If small particles constituting the object to be detected move in the space with a velocity v in a direction crossing the interference fringes, the scattered light becomes bright-dark corresponding to the bright-dark positions in the space, and the frequency f of the scattering is:

$$\begin{aligned} f &= v/P_0 \\ &= 2 \cdot v(P_A - P_B) \end{aligned}$$

which is independent from $\lambda$.

This Doppler (brightness-darkness) signal component is focused by a lens 38 onto the light-receiving element 4, and the moving velocity of the object can be detected by generating pulse signals of a frequency proportional to the moving velocity v by means of a known signal processing circuit composed for example of an amplifier, a filter, a binarizing circuit, etc. More preferably, the signal processing circuit or a part thereof is incorporated in the sensor unit, whereby the level of integration is elevated.

The present embodiment provides a very simple, compact and inexpensive laser Doppler displacement sensor capable of highly precise and stable speed detection, since the interference optical system is composed of optical elements such as lenses and diffraction gratings prepared by the replica method and laminated on both sides of a glass plate as in the foregoing embodiments. Besides, the present embodiment provides the following additional features:

(1) Since the separation angle $\theta_A$ and the incident angle $\theta_B$ of the light beams are determined by two sets of diffraction gratings (36, 37A or 37B), the Doppler frequency f is not influenced by a variation in the incident angle $\theta_B$ into the object due to a fluctuation in the wavelength $\theta$ of the light source, so that the semiconductor laser in which the fluctuation in the wavelength is unavoidable can be employed without a temperature compensating function. Such a temperature compensating function may be added if a higher stability is required in the sensor. In combination with the fact that the detection signal is not influenced by the temperature variation and that the sensor unit is constructed as a one-chip component, there can be obtained a very high resistance to severe ambient conditions such as temperature variation or mechanical vibrations.

(2) For picking up the light scattered from the object in a wide range, there is required a condenser lens of a large numerical aperture (NA). In the present embodiment, the condensing light path to the object is inclined to reduce the NA, the object is irradiated through small diffraction gratings 36, 37A, 37B and the lens 35, a returning light path to pick up the scattered light from the object is deviated, and the light is condensed by a lens of a large NA. Thus, a Doppler signal of satisfactory quality can be obtained, and the outgoing and returning light paths can be easily separated. Therefore, the scattered light can be received by the light-receiving element 4 positioned separate from the light source, without a special optical system such as a half mirror for splitting the light path to obtain the Doppler signal, so that the number of the components of the optical system can be reduced.

(3) Since the outgoing and returning optical paths are separated from each other, the light reflected on the faces of plural optical elements on the glass plate never enter the light-receiving element.

(4) Also, since the outgoing and returning optical paths are separated from each other, the distance between the light-emitting element and the lens can be reduced by the use of a small microlens of a short focal length, thus facilitating the attainment of a compact and thin structure.

(5) Since the optical path of the light beam from the light-emitting element is bent by a reflective element, there can be obtained a desired focal length between the light-emitting element and the lens even if the glass plate and the light-emitting element are positioned close, whereby a thin structure can be easily attained.

(6) A finer pitch of the diffraction grating 36 increases the separation angle $\theta_A$ by diffraction, so that the diffracted light can be spatially separated sufficiently even if the distance to the diffraction gratings 37A, 37B is small (namely even if the glass plate 8 is thin). Consequently, there can be obtained a sufficient working distance, and there can be designed a Doppler device convenient for handling even in a thin compact configuration. By selecting a finer pitch for the diffraction gratings 37A, 37B under such a condition, the incident angle $\theta_B$ to the object increases to attain a larger Doppler shift, thereby realizing a Doppler displacement sensor of a higher sensitivity and a higher resolution. It is therefore possible to satisfy all the conditions of high sensitivity, high resolution, compact and thinner structure and ease of handling.

Tenth Embodiment

In the following there will be explained a Doppler displacement sensor constituting a tenth embodiment of the present invention, with reference to FIGS. 13A to 13C. The small components of a size in the order of millimeters, employed in the present embodiment, require an extremely high precision of assembly, since even a positional deviation of several tens of microns results in a large deviation of the optical paths, thus significantly deteriorating the detecting accuracy. For this reason, the present embodiment is provided with an adjusting mechanism for facilitating the adjustment of the optical system. The detecting principle of the Doppler displacement sensor is the same as that in the foregoing embodiment.

Figure 13A:
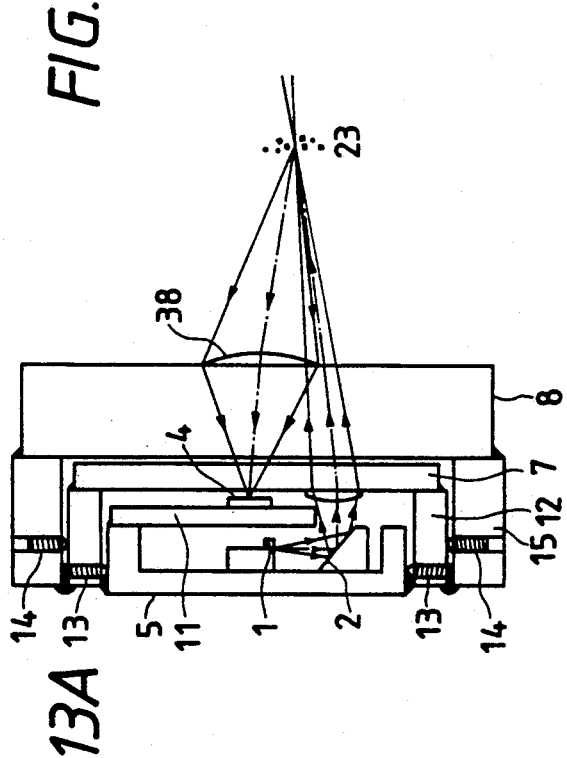
FIGS. 13A to 13C are views showing the configuration of a tenth embodiment.
Figure 13B:
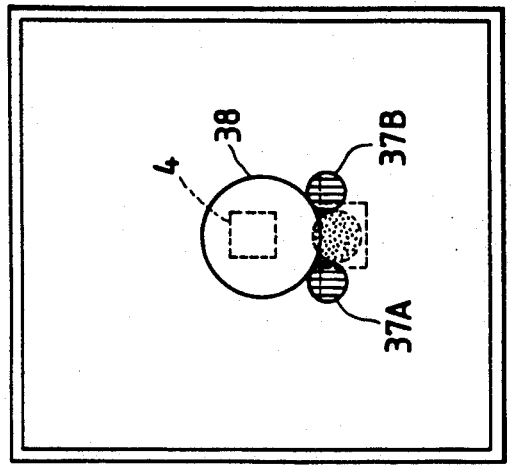
Figure 13C:
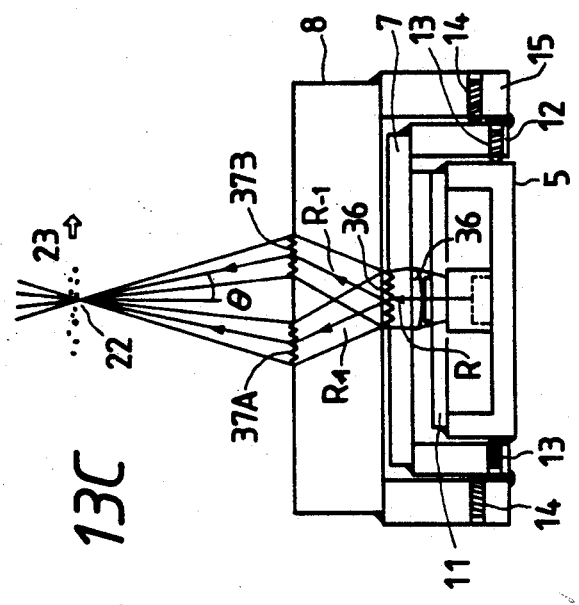

Referring to FIGS. 13A to 13C, around the casing 5 incorporating the optical members such as the light-emitting element 1 and the mirror 2, there is provided a fixing frame 12. A glass plate 7, on which optical function elements similar to those in the foregoing embodiment are formed, is mounted on the upper face of the fixing frame 12. Around the fixing frame 12 there is provided a fixing frame 15. A glass plate 8, on which the optical function elements similar to those in the foregoing embodiment are formed, is mounted on the upper face of the fixing frame 15. The optical members fixed in the casing 5 can be aligned with the optical function elements, such as lenses and diffraction gratings formed on the glass plates 7, 8 by the adjustment of the relative positional relationship of the casing 5, fixing frame 12 and fixing frame 15. After the adjustment, these components are fixed by screw mechanisms 13, 14 provided on four sides of the fixing frames 12, 15, and the stability is increased by filling the gaps with an adhesive material. Thus, the present embodiment can provide a highly precise Doppler displacement sensor allowing easy adjustment in the assembly, because the components of the sensor are formed into three units between which the relative adjustment can be performed.

Eleventh Embodiment

Figure 14:
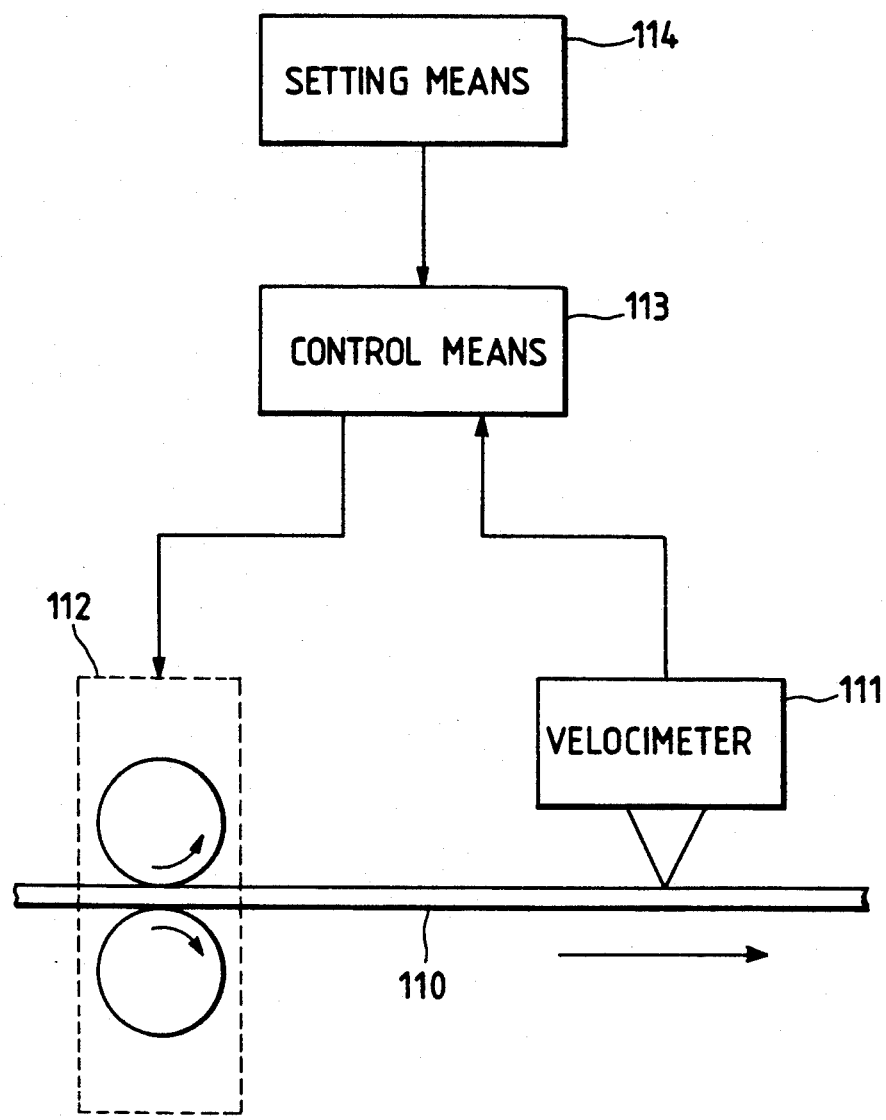
FIG. 14 is a block diagram of a driving system with a Doppler displacement sensor, constituting an eleventh embodiment.

FIG. 14 is a block diagram of a driving system, adapted for use principally in an image recording apparatus or an image reading apparatus and representing an application of the Doppler displacement sensor explained above. A moving object 110, such as a recording sheet, is moved by driving means 112 provided with a driving mechanism including a driving motor and rollers. The amount of displacement or the displacing velocity of the object 110 is detected, in a non-contact state, by a displacement sensor 111 according to the ninth or tenth embodiment. The detection output of the displacement sensor is fed back to control means 113, which sends a drive signal to the driving means 112 so as to attain a condition set by setting means 114. The displacing object 110 can be moved as set by the setting means 114 by means of such feedback system. Such a driving system is applicable to office equipment such as a typewriter, printer, copying machine or facsimile; image processing equipment such as a camera or video equipment; information record/reproducing equipment; robots; working machines, manufacturing apparatus, transportation apparatus or any other apparatus equipped with driving means.

Modifications

Though the foregoing embodiments have been limited to encoders and Doppler displacement sensors, the present invention is not limited to such embodiments and is subjected to various modifications within the scope and spirit of the present invention.

For example, in the foregoing embodiments, as the casing, an opaque ceramic package commonly used as the package for semiconductor chips or a CCD photosensor device is employed, but there may instead be employed a metal package. Also, the glass plate may be replaced by a transparent plastic plate.

Also, the replica lens employed in the foregoing embodiments may be replaced by a component of equivalent function, such as a Fresnel lens or a zone plate. Further, the replica diffraction grating may be replaced in cross-sectional shape by a blazed grating or an amplitude grating.

As detailedly explained in the foregoing, the present invention can provide an optical sensor which can simultaneously attain miniaturization and a high precision and a high resolution at a very high level, and which has a high resistance to ambient conditions.

What is claimed is:

1. A displacement detecting device for detecting information relating to a displacement of an object, comprising:

a light source;

a transparent member;

a light beam transforming optical element for transforming converge-diverge condition of a light beam from said light source;

an optical splitting element for splitting the light beam transformed by said light beam transforming optical element, whereby at least two light beams split by said optical splitting element are irradiated onto said object, said light beam transforming optical element and said optical splitting element being integrally provided on said transparent member, and being mounted on different faces thereof, and the light beam from said light source passing through said transparent member from said light beam transforming optical element to said optical splitting element; and a detection system for performing detection by mixing and interfering said at least two light beams which come from said object, said detection system including at least a light-receiving element for detecting the light beam, whereby the information relating to the displacement of a said object is measured on the basis of detection signal of said light-receiving element.

2. A device according to claim 1, wherein said optical splitting element is so positioned that said at least two light beams enter a diffraction grating provided on the object, and said detection system performs the detection in such a manner that said at least two light beams diffracted by said diffraction grating are mixed and interfered.

3. A device according to claim 2, wherein said detection system includes an optical mixing element for mixing said at least two light beams diffracted by said diffraction grating.

4. A device according to claim 3, wherein said optical mixing element is formed integrally with said light beam transforming optical element and said optical splitting element on said transparent member.

5. A device according to claim 4, wherein said light beam transforming optical element comprises a lens, and said optical splitting element and said optical mixing element comprise a diffraction grating.

6. A device according to claim 2, wherein an amount of relative displacement of said diffraction grating with respect to said detection system is measured on the basis of a detection signal of said light-receiving element.

7. A device according to claim 1, wherein said light beam transforming optical element comprises a lens.

8. A device according to claim 1, wherein said optical splitting element comprises a diffraction grating.

9. A device according to claim 1, wherein said detection system performs the detection in such a manner that said at least two light beams scattered by said object are mixed and interfered.

10. A device according to claim 8, wherein a relative velocity of said object with respect to said detection system is measured, on the basis of a detection signal of said light-receiving element.

11. A device according to claim 1, wherein said optical splitting element is adapted to split the light beam from said light beam transforming optical element into three light beams, and said detection system is so positioned that an interference light of two-times diffracted light beams generated from said object by two among said three light beams is detected by a first light-receiving element, and that another interference light of two-times diffracted light beams generated from said object by two light beams of a different combination among said three light beams is detected by a second light-receiving element.

12. A device according to claim 1, wherein said light source and said transparent member are integrally positioned in a frame.

13. A device according to claim 12, wherein said detection system also is provided integrally in said frame, together with said light source and said transparent member.

14. An apparatus for driving an object, comprising:
a light source;
a transparent member;
a light beam transforming optical element for transforming a converge-diverge condition of a light beam from said light source;
an optical splitting element for splitting the light beams transformed by said light beam transforming optical element, whereby at least two light beams split by said optical splitting element are irradiated onto said object,
said light beam transforming optical element and said optical splitting element being integrally provided on said transparent member, and being mounted on different faces thereof, the light beam from said light source passing through said transparent member from said light beam transforming optical system to said optical splitting element;
a detection system for performing detection by mixing and interfering said at least two light beams which come from said object, said detection system including at least a light-receiving element for detecting the object;
a driving unit for effecting relative drive between said object and said detection system; and
a control unit for controlling said driving unit on the basis of a detection signal of said light-receiving element.

* * * * *

UNITED STATES PATENT AND TRADEMARK OFFICE
CERTIFICATE OF CORRECTION

PATENT NO. : 5,283,434
DATED : February 1, 1994
INVENTOR(S) : KOH ISHIZUKA, ET AL.

It is certified that error appears in the above-indentified patent and that said Letters Patent is hereby corrected as shown below:

COLUMN 3
   Line 19, "same" should read --the same--.

COLUMN 5
   Line 10, "without," should read --without--.

COLUMN 6
   Line 35, "of being" should read --being--.

COLUMN 8
   Line 29, "S/N" should read --S/N ratio.--.

COLUMN 10
   Line 5, "clement" should read --element--.

COLUMN 11
   Line 60, "wavelength θ" should read --wavelength λ--.

COLUMN 13
   Line 58, "commonly," should read --commonly--.

UNITED STATES PATENT AND TRADEMARK OFFICE
CERTIFICATE OF CORRECTION

PATENT NO. : 5,283,434

DATED : February 1, 1994

INVENTOR(S) : KOH ISHIZUKA, ET AL

It is certified that error appears in the above-indentified patent and that said Letters Patent is hereby corrected as shown below:

COLUMN 14

Line 32, "a" should be deleted; and
Line 33, "of" (1st occurrence) should read —of a—

Signed and Sealed this

Thirteenth Day of September, 1994

Attest:

BRUCE LEHMAN

*Attesting Officer*   *Commissioner of Patents and Trademarks*